United States Patent Office 2,863,804
Patented Dec. 9, 1958

2,863,804

METHOD OF TREATING MANGE WITH EXTRACT OF CEDAR LEAF

Alex M. Fuqua, Brewton, Ala.

No Drawing. Application September 11, 1956
Serial No. 609,057

1 Claim. (Cl. 167—53.2)

This invention relates to a veterinary preparation and treatment method, and it has for its object to provide a preparation for treating skin diseases of animals caused by parasites and a method for treating and curing such skin diseases.

More specifically, it is the object of the invention to treat and effectively combat mange and other skin diseases caused by mites or fungi in dogs.

Mange (scabies) is an inflammatory disease of the skin of dogs and other animals caused by attacks of minute acarine parasites, usually called mites. These parasites belong to the class Arachnidae and to the order Acari. A certain number of species of these mites called Psoric mites give rise by their bites, by the rapidity of their multiplication, and by the excavation of galleries in the skin, to the above mentioned highly contagious disease. Different species of the parasites cause somewhat different types of the disease. The most serious afflictions are caused by the species called Demodicidae and by Sarcoptidae, the type of mange produced by these species being accordingly termed demodectic and sarcoptic mange. The seriousness of the affliction caused by these species of mites is due to the difficulty to reach the parasites. The female of the Sarcoptidae burrows beneath the skin, and thus lodges in a region which is difficult to reach by acaricides. The species Demodicidae gives rise to a disease called Demodectic or follicular mange which is most difficult to cure, because the mites burrow down and infest the hair follicles and sebaceous glands and their location is thus so deep that they cannot easily be reached.

Proliferation and desquamation of the epidermal cells upon the skin surface is caused by their attack and, moreover, the afflicted cells are immediately invaded by secondary parasites, such as bacteria and fungi, or both. Progressive emaciation and a most disagreeable odor are the result of these complications.

The type of mange above mentioned has been peculiarly resistant to successful treatment. The treatment generally applied consists in applying sulphur in one form or another, either in the form of an ointment or in the form of a mixture with animal or vegetable oil. The effectiveness of the sulphur treatment is always doubtful.

I have now discovered that mange can be treated with marked success within a short time with a decoction of small green cedar foliage. The decoction is applied to the skin of the affected animal. The decoction is harmless, insofar as even if consumed by the animals licking themselves, an activity which can only be prevented with difficulty, no harmful results have ever been noticed.

The decoction when applied causes affected layers of skin to peel off from the affected place. After this peeling process has been completed, the healing process sets in and the hair again begins to grow.

The decoction has been applied with marked success in a large number of cases of affliction with demodectic and sarcoptic mange and also in the case of other types of mange, and even for other fungus infections of dogs. Many cases require only a single treatment. Severe cases must be treated repeatedly and are preferably given one treatment each week. The treatment has proved to be effective in a number of cases in which the animal has been suffering from mange for several years.

The effective ingredient is a cedar leaf oil extracted from the cedar leaves of the red cedar, *Juniperus virginiana*.

The decoction produced by boiling the leaves, and especially the small leaves of the red cedar, when applied to the skin, obviously penetrates to a sufficient depth to destroy the mites. When applied to dogs, it has been proved to be of advantage to apply the decoction to the entire body surface of the dog, taking care that the entire body is well saturated with the decoction. The decoction is then allowed to dry on the body.

The skin, after a few days, starts to come off in the form of dry scales similar to dry dandruff. The decoction seems to have a bactericide or bacteriostat and also a fungicide property, as it is also active against other diseases caused by fungi.

EXAMPLE 3 lbs. of small green foliage of the red cedar, using no branches over ¼ of an inch in diameter, are used for each gallon of water. The water with the foliage in it is boiled for 45 minutes under constant agitation of the foliage. Then the cedar foliage is removed, the decoction is strained and is put into suitable containers. If the liquid is to be applied soon, nothing further need be added. If the liquid is, however, prepared for storage, it is preferable to add a small quantity of alcohol, one pint of alcohol being best used for each three gallons of liquids in order to prevent the appearance of molds.

Before the treatment of an afflicted animal, external parasites of the visible type, such as fleas, are first removed. Then the decoction is applied with a brush, such as a paint brush, rubbing it well into the skin. The liquid should be allowed to dry on the dog and the dog should not be dried, by some drying means, to permit penetration of the decoction to a sufficient depth.

The preparation has many obvious advantages, one of them being the fact that it is more effective and acts quicker than any known preparation. It is harmless when ingested, and after having been allowed to dry—during which time the animal should be prevented from licking it off—it has penetrated to a sufficient extent so that it cannot be removed by constant licking. This is a marked advantage over the usual sulphur preparations, which are not as harmless when ingested and, whether applied in the form of an ointment or in the form of a mixture or suspension in an oil, remains on the skin and is easily removed by licking.

As the decoction is also beneficial in all those cases where a secondary parasite invasion took place, and in any case does not irritate such affected places, said secondary infections heal immediately when the primary cause of the disease has been removed. When applied, it seems to penetrate into the glands and follicles of the hair, as sarcoptic mange, in which the mites penetrate into the hair follicles, may be treated exactly in the same way with marked success.

It will be clear that the data above stated may be somewhat changed without in any way departing from the essence of the invention as described in the annexed claim.

What is claimed as new is as follows:

A method of treating mange in dogs which consists of boiling small foliage of the red cedar (*Juniperus virginiana*) in water in the proportion of 3 lbs. cedar leaf foliage, 1 gallon of water, during 45 minutes, cooling and straining the liquid and applying the strained liquid by means of a brush to the mange infected skin of the animal until the skin is saturated with the liquid, and then allowing the liquid to dry in air on the body of the animal.

References Cited in the file of this patent

UNITED STATES PATENTS

| | | |
|---|---|---|
| 109,203 | Haumer | Nov. 15, 1870 |
| 438,593 | Giles | Oct. 14, 1890 |
| 710,665 | Cannon | Oct. 7, 1902 |
| 1,630,836 | Drushel | May 31, 1927 |
| 2,739,097 | Ward | Mar. 20, 1956 |

OTHER REFERENCES

U. S. Disp., 24th Ed., 1947, pp. 242 and 1494.

Remington's Practice of Pharmacy, 9th Ed., 1948, pp. 698–700.